(12) United States Patent
Sly et al.

(10) Patent No.: US 11,851,193 B2
(45) Date of Patent: Dec. 26, 2023

(54) BLENDED OPTICAL AND VANE SYNTHETIC AIR DATA ARCHITECTURE

(71) Applicant: Rosemount Aerospace Inc., Burnsville, MN (US)

(72) Inventors: Jaime Sly, Savage, MN (US); Brian Daniel Matheis, Lakeville, MN (US); Kaare Josef Anderson, Farmington, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 442 days.

(21) Appl. No.: 16/953,807

(22) Filed: Nov. 20, 2020

(65) Prior Publication Data
US 2022/0161933 A1 May 26, 2022

(51) Int. Cl.
*B64D 15/20* (2006.01)
*G01P 5/26* (2006.01)
*G01S 17/95* (2006.01)

(52) U.S. Cl.
CPC ............... *B64D 15/20* (2013.01); *G01P 5/26* (2013.01); *G01S 17/95* (2013.01)

(58) Field of Classification Search
CPC B64D 15/20; B64D 15/22; G01P 5/26; G01S 17/95
See application file for complete search history.

(56) References Cited

U.S. PATENT DOCUMENTS

| | | |
|---|---|---|
| 3,921,173 A | 11/1975 | Thomson |
| 4,913,519 A | 4/1990 | Klainer et al. |
| 5,028,929 A | 7/1991 | Sand et al. |
| 5,202,692 A | 4/1993 | Huguenin et al. |
| 5,214,438 A | 5/1993 | Brusgard et al. |
| 5,243,185 A | 9/1993 | Blackwood |
| 5,285,256 A | 2/1994 | Nelson et al. |
| 5,307,077 A | 4/1994 | Branigan et al. |
| 5,327,149 A | 7/1994 | Kuffer |
| 5,488,375 A | 1/1996 | Michie |
| 5,500,530 A | 3/1996 | Gregoris |

(Continued)

FOREIGN PATENT DOCUMENTS

| | | |
|---|---|---|
| CA | 2048991 C | 12/1998 |
| CA | 2982114 A1 | 6/2018 |

(Continued)

OTHER PUBLICATIONS

Extended European Search Report for EP Application No. 21209595.4, dated Apr. 8, 2022, pp. 11.

(Continued)

*Primary Examiner* — Michael H Wang

(74) *Attorney, Agent, or Firm* — Kinney & Lange, P. A.

(57) ABSTRACT

An optical ice detector and airspeed probe includes an ice detection module and an airspeed module. The ice detection module detects the presence or absence of ice, water, or ice and water particles, and the airspeed module determines a line-of-sight speed along a directional vector, each based on backscatter light returns emitted from a common collimated light source. An electronics module determines an airspeed of an aircraft based on the line-of-sight speed determined by the airspeed module and at least one aircraft parameter received from the air data system.

18 Claims, 7 Drawing Sheets

(56) References Cited

U.S. PATENT DOCUMENTS

| | | | |
|---|---|---|---|
| 5,546,183 A | 8/1996 | Fegley et al. | |
| 5,621,410 A | 4/1997 | Gray et al. | |
| 5,748,091 A | 5/1998 | Kim | |
| 5,973,649 A | 10/1999 | Andressen | |
| 6,069,565 A | 5/2000 | Stern et al. | |
| 6,091,335 A * | 7/2000 | Breda | B64D 15/20 |
| | | | 340/580 |
| 6,166,699 A | 12/2000 | Khammouni et al. | |
| 6,225,955 B1 | 5/2001 | Chang et al. | |
| 6,295,034 B1 | 9/2001 | Brown et al. | |
| 6,377,202 B1 | 4/2002 | Kropfli et al. | |
| 6,377,205 B1 | 4/2002 | Eckersten et al. | |
| 6,377,207 B1 | 4/2002 | Solheim et al. | |
| 6,425,286 B1 | 7/2002 | Anderson et al. | |
| 6,430,996 B1 * | 8/2002 | Anderson | G01K 13/028 |
| | | | 73/170.26 |
| 6,606,066 B1 | 8/2003 | Fawcett et al. | |
| 6,777,684 B1 | 8/2004 | Volkov et al. | |
| 6,819,265 B2 | 11/2004 | Jamieson et al. | |
| 7,283,791 B2 | 10/2007 | Nilsson et al. | |
| 7,370,525 B1 * | 5/2008 | Zhao | B64D 15/20 |
| | | | 73/170.21 |
| 7,379,166 B2 | 5/2008 | Meneely et al. | |
| 7,400,260 B2 * | 7/2008 | Levine | G08B 19/02 |
| | | | 250/341.1 |
| 7,986,408 B2 * | 7/2011 | Ray | B64D 15/20 |
| | | | 356/342 |
| 8,022,842 B2 | 9/2011 | Levine | |
| 8,144,325 B2 | 3/2012 | Ray et al. | |
| 8,320,424 B2 | 11/2012 | Bolt et al. | |
| 8,338,785 B2 | 12/2012 | Ray | |
| 8,451,435 B2 | 5/2013 | Schlotterbeck et al. | |
| 8,527,233 B2 | 9/2013 | McIntyre | |
| 8,604,963 B1 | 12/2013 | Kronfeld et al. | |
| 8,620,495 B2 | 12/2013 | Alwin et al. | |
| 8,654,427 B1 | 2/2014 | DeAngelo | |
| 8,761,970 B2 | 6/2014 | McIntyre et al. | |
| 9,041,926 B2 | 5/2015 | Ray et al. | |
| 9,096,323 B1 | 8/2015 | Ray et al. | |
| 9,116,243 B1 * | 8/2015 | Brown | G01S 17/18 |
| 9,188,700 B2 | 11/2015 | Bunch et al. | |
| 9,222,873 B2 | 12/2015 | Baumgardner et al. | |
| 9,244,166 B1 | 1/2016 | Finley et al. | |
| 9,295,245 B1 | 3/2016 | Guice et al. | |
| 9,304,081 B2 | 4/2016 | Rennó | |
| 9,588,220 B2 * | 3/2017 | Rondeau | G01S 17/08 |
| 9,924,138 B1 | 3/2018 | Brown | |
| 9,932,127 B2 | 4/2018 | Anderson et al. | |
| 10,006,928 B1 | 6/2018 | Hagerott et al. | |
| 10,147,244 B2 | 12/2018 | Atalla et al. | |
| 10,320,141 B2 | 6/2019 | Miller et al. | |
| 10,429,511 B2 * | 10/2019 | Bosetti | G01S 7/499 |
| 10,444,367 B2 | 10/2019 | Lodden et al. | |
| 10,723,479 B2 | 7/2020 | Anderson et al. | |
| 10,725,173 B2 | 7/2020 | Ray et al. | |
| 10,775,504 B2 * | 9/2020 | Garde | B64D 43/00 |
| 10,816,661 B2 * | 10/2020 | Ray | G01S 7/025 |
| 2004/0036630 A1 | 2/2004 | Jamieson et al. | |
| 2007/0247612 A1 | 10/2007 | Pack et al. | |
| 2008/0137058 A1 | 6/2008 | Cesare | |
| 2008/0251733 A1 | 10/2008 | Anderton | |
| 2009/0027651 A1 | 1/2009 | Pack et al. | |
| 2009/0222150 A1 | 9/2009 | Preaux | |
| 2010/0110431 A1 | 5/2010 | Ray et al. | |
| 2010/0328143 A1 | 12/2010 | Kirk | |
| 2010/0332056 A1 | 12/2010 | Kirk | |
| 2011/0219869 A1 * | 9/2011 | Asahara | G01S 17/95 |
| | | | 73/181 |
| 2012/0274938 A1 * | 11/2012 | Ray | B64D 15/20 |
| | | | 356/342 |
| 2013/0103316 A1 | 4/2013 | Ray et al. | |
| 2013/0162974 A1 * | 6/2013 | Dakin | G01S 7/4818 |
| | | | 356/28 |
| 2014/0180503 A1 | 6/2014 | Colliau et al. | |
| 2015/0233962 A1 | 8/2015 | Tchoryk et al. | |
| 2015/0333010 A1 | 11/2015 | Zinn | |
| 2016/0356890 A1 | 12/2016 | Fried et al. | |
| 2017/0276790 A1 * | 9/2017 | Lodden | B64D 43/02 |
| 2017/0356997 A1 | 12/2017 | Ray et al. | |
| 2018/0024270 A1 | 1/2018 | Ray et al. | |
| 2018/0088239 A1 | 3/2018 | Garde | |
| 2018/0172720 A1 | 6/2018 | Miller et al. | |
| 2019/0094256 A1 * | 3/2019 | Naslund | G01P 5/26 |
| 2019/0146090 A1 | 5/2019 | Sly et al. | |
| 2019/0170863 A1 | 6/2019 | Sly et al. | |
| 2019/0217966 A1 * | 7/2019 | Winter | B64D 43/02 |
| 2020/0183015 A1 | 6/2020 | Garde | |

FOREIGN PATENT DOCUMENTS

| | | |
|---|---|---|
| CN | 109039449 A | 12/2018 |
| DE | 102006032387 A1 | 1/2008 |
| DE | 102014105366 A1 | 10/2015 |
| EP | 1428046 B1 | 4/2006 |
| EP | 1936386 A2 | 6/2008 |
| EP | 2184232 A2 | 5/2010 |
| EP | 2434296 A2 | 3/2012 |
| EP | 2518529 A2 | 10/2012 |
| EP | 3301456 A1 | 4/2018 |
| EP | 3663773 A1 | 6/2020 |
| FR | 3093567 A1 | 9/2020 |
| GB | 2559885 A | 8/2018 |
| JP | 2000075029 A | 3/2000 |
| WO | WO0111582 A1 | 2/2001 |
| WO | WO03050778 A1 | 6/2003 |
| WO | WO2014181014 A1 | 11/2014 |
| WO | WO2015179905 A1 | 12/2015 |

OTHER PUBLICATIONS

Extended European Search Report for EP Application No. 21209679.6, dated Apr. 11, 2022, pp. 9.
First Canadian Office Action for CA Application No. 2961046, dated Oct. 24, 2022, pp. 3.
First Canadian Office Action for CA Application No. 2961050, dated Oct. 27, 2022, pp. 8.
First Brazilian Office Action for BR Application No. BR1020170088189, dated May 26, 2022, pp. 6.
First Brazilian Office Action for BR Application No. BR1020170088200, dated May 26, 2022, pp. 6.
Joseph Nemarich et al., "Backscatter and Attenuation by Falling Snow and Rain at 96, 140, and 225 GHz", IEEE Transactions of Geosceince and Remote Sensing, Vo., 26, No. 3, May 1988.
James B. Mead et al., "Remote Sensing of Clouds and For with a 1.4-mm Radar", Journal of Atmospheric and Oceanic Technology, vol. 6, pp. 1090-1097, 1989.
Robin J. Hogan and Anthony J. Illingworth, "The Potential of Spaceborne Dual-Wavelength Radar to Make Global Measurements of Cirrus Clouds", J. Atmos Oceanic Tech, 1999, 16, 518-531.
V. Vasic, D. G. Feist, S. Muller and N. Kampfer, "An airborne radiometer for stratospheric water vapor measurements at 183 GHz," in IEEE Transactions on Geoscience and Remote Sensing, vol. 43, No. 7, pp. 1563-1570, Jul. 2005. (Year: 2005.
Luke et al., "Detection of supercooled liquid in mixed-phase clouds using radar Doppler spectra", Journal of Geophysical Research, vol. 115, No. D19, Oct. 16, 2010.
S.L. Durden et al., "A Cloud and Precipitation Radar System Concept for the ACE Mission", 2011 California Institute of Technology.
Cooper et al., "A Grating-Based Circular Polarization Duplexer for Submillimeter-Wave Transceivers", IEEE Microwave and Wireless Components Letters, vol. 22, No. 3, Mar. 2012.
Leal-Sevillano et al., "A 225 GHz Circular Polarization Waveguide Duplexer Based on a Septum Orthomode Transducer Polarizer", IEEE Transactions of Terahertz Science and Technology, vol. 3, No. 5, Sep. 2013.
A. Battaglia et al., "G Band Atmospheric Radars: New Frontiers in Cloud Physics", Atmos. Meas. Tech., 7, 1527-1546, 2014.

(56) References Cited

OTHER PUBLICATIONS

Extended European Search Report for EP Application No. 17171547.7, dated Nov. 8, 2017, pp. 9.
Extended European Search Report for EP Application No. 17171553.5, dated Nov. 7, 2017, pp. 8.
Extended European Search Report for EP Application No. 17207656.4, dated Mar. 2, 2018, pp. 8.
Lin C. C. et al: "Macsim: a cloud profiling radar for studying the Earth radiation processes and budget", Radar '97. Edinburgh, Oct. 14-16, 2019; [IEE Conference Publication], London: IEE GB, vol. No. 449, Oct. 14, 1977 (Oct. 14, 1997), pp. 361-365, XP006508968, DOI: 10.1049/CP:19971696 ISBN: 978-0-85296-698-3 *paragraph [001] -[0004], [05.2]*.
Brandon Redding et al. "Using a mutimode fiber as a high resolution, low loss spectrometer," Department of Applied Physics, Yale University, New Haven, CT, 06520, pp. 3.

\* cited by examiner

BLENDED OPTICAL AND VANE SYNTHETIC AIR DATA ARCHITECTURE

BACKGROUND

The present invention relates generally to air data systems for aircraft, and more particularly, to air data systems integrating optical ice detectors into the air data system, providing air data and ice detection outputs to consuming systems of the aircraft.

Modern aircraft often incorporate air data systems that calculate air data outputs based on measured parameters collected from various sensors positioned about the aircraft. For instance, many air data systems utilize air data probes that measure pneumatic pressure of airflow about the aircraft exterior to generate aircraft air data outputs, such as angle of attack (i.e., an angle between the oncoming airflow or relative wind and a reference line of the aircraft, such as a chord of a wing of the aircraft), angle of sideslip (i.e., the angle between the oncoming airflow or relative wind and the aircraft centerline extending through the nose of the aircraft), calibrated airspeed, Mach number, altitude, or other air data parameters.

Air data systems often determine critical air data parameters such as airspeed and angle of attack using dissimilar means such that redundant air data parameters are not susceptible to common failure modes. Recent attempts to increase dissimilarity of airspeed has led to incorporating molecular-based optical systems. However, conventional molecular-based optical systems can be cost prohibitive as well as increase air data system complexity. Further, retrofitting existing air data systems may not be feasible.

SUMMARY

An optical ice detector and airspeed probe includes an ice detection module and an airspeed module. The ice detection module detects the presence or absence of ice, water, or ice and water particles, and the airspeed module determines a line-of-sight speed along a directional vector, each based on backscatter light returns emitted from a common collimated light source. An electronics module determines an airspeed of an aircraft based on the line-of-sight speed determined by the airspeed module and at least one aircraft parameter received from the air data system.

DETAILED DESCRIPTION

Figure 1:
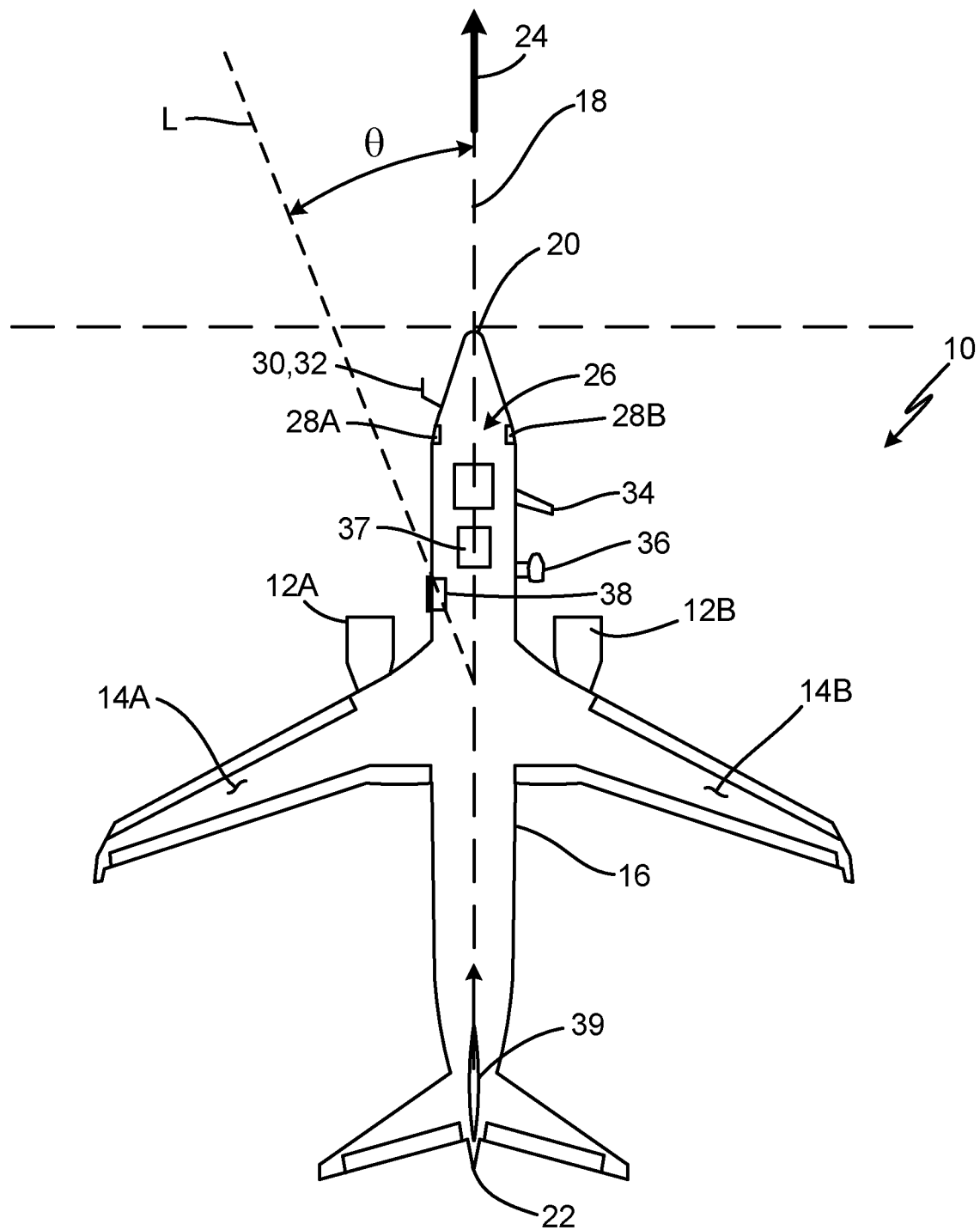
FIG. 1 is a schematic representation of an aircraft that includes an optical ice detection and airspeed probe.

FIG. 1 is a plan view showing a schematic representation of aircraft 10. As shown, aircraft 10 is a typical fixed-wing aircraft propelled by engines 12A and 12B mounted to the underside of respective wings 14A and 14B. Fuselage 16, to which each wing 14A, 14B is attached, extends along longitudinal centerline 18 from forward end (or nose) 20 to aft end (or tail) 22. In operation, engines 12A and 12B propel aircraft 10 along the ground or through the air as indicated by arrow 24.

While aircraft 10 is depicted as a fixed-wing aircraft with dual engines, other aircraft types and engine configurations are also within the scope of the disclosure. For instance, aircraft 10 can be any aircraft including a helicopter, other rotary-wing aircraft, and fixed-wing aircraft other than the configuration shown in FIG. 1. Furthermore, this disclosure includes other engine configurations, including fewer or more than two engines, engines mounted on an aircraft fuselage, engines mounted on the upper side of wings, and any other engine configurations.

Aircraft 10 includes air data system 26 that calculates air data outputs based on measured parameters collected from various sensors positioned about the aircraft. For instance, air data system 26 can include air data probes that measure pneumatic pressure of oncoming airflow about the aircraft exterior to generate air data outputs, such as angle of attack (i.e., an angle between the oncoming airflow or relative wind and a reference line of aircraft 10, such as a chord of wing 14A, 14B of aircraft 10), angle of sideslip (i.e., an angle between the oncoming airflow and longitudinal centerline 18 extending through nose forward end 20 of aircraft 10) calibrated airspeed, Mach number, altitude, or other air data parameters. Air data probes relying on pneumatic measurements or aerodynamic interaction with the oncoming airstream include static pressure probes 28A and 28B, pitot pressure probe 30, multi-function probe 32, angle of attack sensor 34, total air temperature probe 36, which may be mounted on the same or opposite sides of aircraft 10 as is known in the art. Air data system 26 can also include inertial reference unit 37 for providing inertial data of aircraft 10 to air data system 26.

Additionally, air data system 26 can include at least one optical ice detection and airspeed probe 38 that detects the presence of icing conditions forward of aircraft wings 14A and 14B using ice detection module 40 as well as calculates airspeed using airspeed module 42, each determination based on backscatter intensity, frequency, and/or time delay. Because optical ice detection and airspeed probe 38 calculates airspeed based on backscatter rather than pneumatic measurements or aerodynamic interaction with the oncoming airflow, optical ice detection and airspeed probe 38 increases dissimilarity of air data system 26 since optical ice detection and airspeed probe 38 does not include pneumatic sensing ports, which can become clogged, blocked, or damaged.

Optical ice detection and airspeed probe 38 is installed on aircraft 10 such that collimated light pulses are emitting along directional vector L. While FIG. 1 depicts directional vector L forming angle θ with respect to longitudinal centerline 18 in a horizontal plane, directional vector L can form angle θ with respect to longitudinal centerline 18 within any plane that includes longitudinal centerline 18. For example, directional vector L and angle θ can be defined within a vertical plane extending perpendicularly to wings 14A and 14B and intersecting vertical stabilizer 39 as well as within any other plane having an orientation between the vertical and horizontal planes that includes longitudinal centerline axis 18. In still other embodiments, directional vector L can be aligned with or parallel to longitudinal axis 18. In each orientation, optical ice detector and airspeed probe 38 queries an airspace forward of wings 14A and 14B. As the directional vector L deviates from the true flight direction of aircraft 10, the difference between a line-of-sight airspeed calculated along directional vector L and the airspeed of aircraft 10 increases. Accordingly, in some embodiments, angle θ is between 0 degrees and 45 degrees and, in other embodiments, between 0 degrees and 15 degrees relative to longitudinal centerline 18 to limit a difference between a forward airspeed of aircraft 10 and a line-of-sight airspeed calculated along directional vector L of optical ice detection and airspeed probe 38. Additionally, while FIG. 1 depicts optical ice detection and airspeed probe 38 on a side of aircraft 10 forward of wings 14A, 14B, optical ice detection and airspeed probe 38 can be located at any location on aircraft 10 with clear line of sight to the airspace forward of aircraft wings 14A and 14B. For instance, optical ice detection and airspeed probe 38 can be located along the uppermost or lowermost portion of fuselage 16 or at an uppermost portion of vertical stabilizer 39, among other possible locations.

Figure 2:
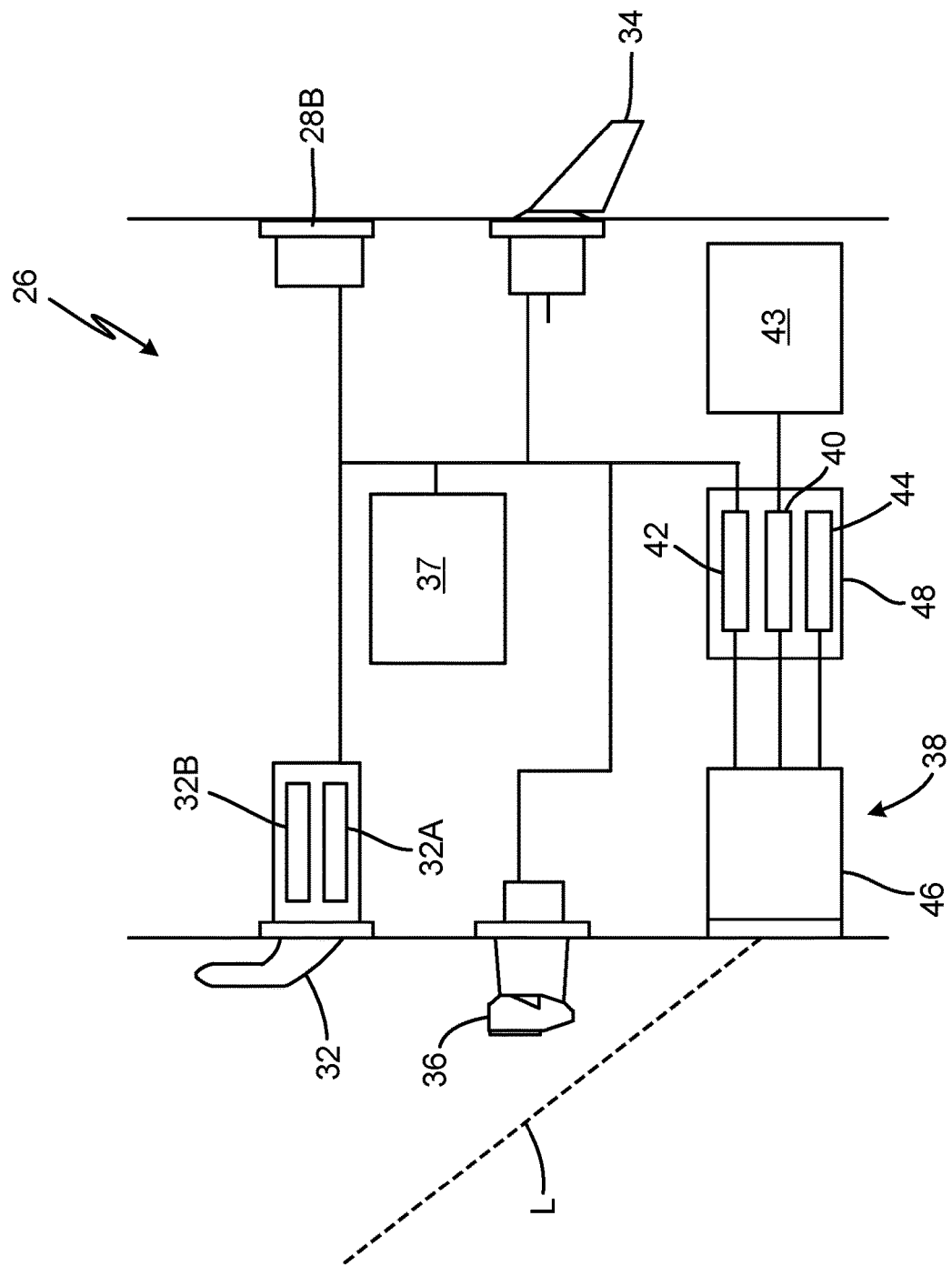
FIG. 2 is an exemplary air data system incorporating the optical ice detection and airspeed probe.

FIG. 2 depicts air data system 26 incorporating optical ice detection and airspeed probe 38. As depicted, ice detection module 40 is coupled to consuming system 43 of aircraft 10, and airspeed module 42 is coupled to air data system 26, consuming system 43, or both. Further, because the orientation of optical ice detection and airspeed probe 38 may not coincide with the flight direction of aircraft 10, line-of-sight airspeed determinations are corrected based on at least one air data parameter from air data system 26 or can be corrected based with aircraft parameters provided by other aircraft systems such as an avionics module in a blended air data system. For instance, airspeed module 42 may be coupled to one of first electronics channel 32A and second electronics channel 32B of multi-function probe 32 or angle of attack sensor 34 such that an angular difference between line-of-sight vector L and the flight direction can be determined. Using such angle of attack and/or angle of sideslip data, line-of-sight airspeed data provided by airspeed module 42 can be corrected to provide an airspeed of aircraft 10. In other embodiments, airspeed of aircraft 10 can be determined based on line-of-sight airspeed data received from airspeed module 42 and an orientation of aircraft 10 determined from inertial data provided by inertial reference unit 37, which can include one or more accelerometers and/or one or more rotational accelerometers (i.e., gyroscopes) to sense linear and/or rotational acceleration of aircraft 10. In still other embodiments, optical ice detection and airspeed probe 38 can receive aircraft data representing a state of the aircraft from consuming system 43 of aircraft 10. Example aircraft parameters can include one or more positions of aircraft control surfaces (e.g., position data for ailerons, flaps, leading edge flaps and slats, rudder, and elevator), aircraft weight, and aircraft center of gravity, among other possible aircraft data. Using aircraft parameter data, an orientation of aircraft 10 can be determined and used to estimate airspeed from line-of-sight airspeed data provided by airspeed module 42.

Ice detection module 40 and airspeed module 42 of optical ice detector and airspeed probe 38 can operate simultaneously, processing backscatter returns produced from the same collimated light pulse or pulses. Alternatively, ice detection module 40 or airspeed module 42 can operate independently, such as when aerosol density or composition within the forward airspace is not suitable for operation of the one of the modules, or when one of ice detection module 40 and airspeed module 42 is inoperable. Further, components of ice detection module 40 and airspeed module 42 can be discrete modules and may contain components tailored to operate with different aerosol densities or compositions within the forward airspace. For instance, components of ice detection module 40 can be tailored to detect ice and/or water particles of a size that is larger or smaller and particle density that is higher or lower relative to particle size and densities targeted by airspeed module 42.

Figure 3:
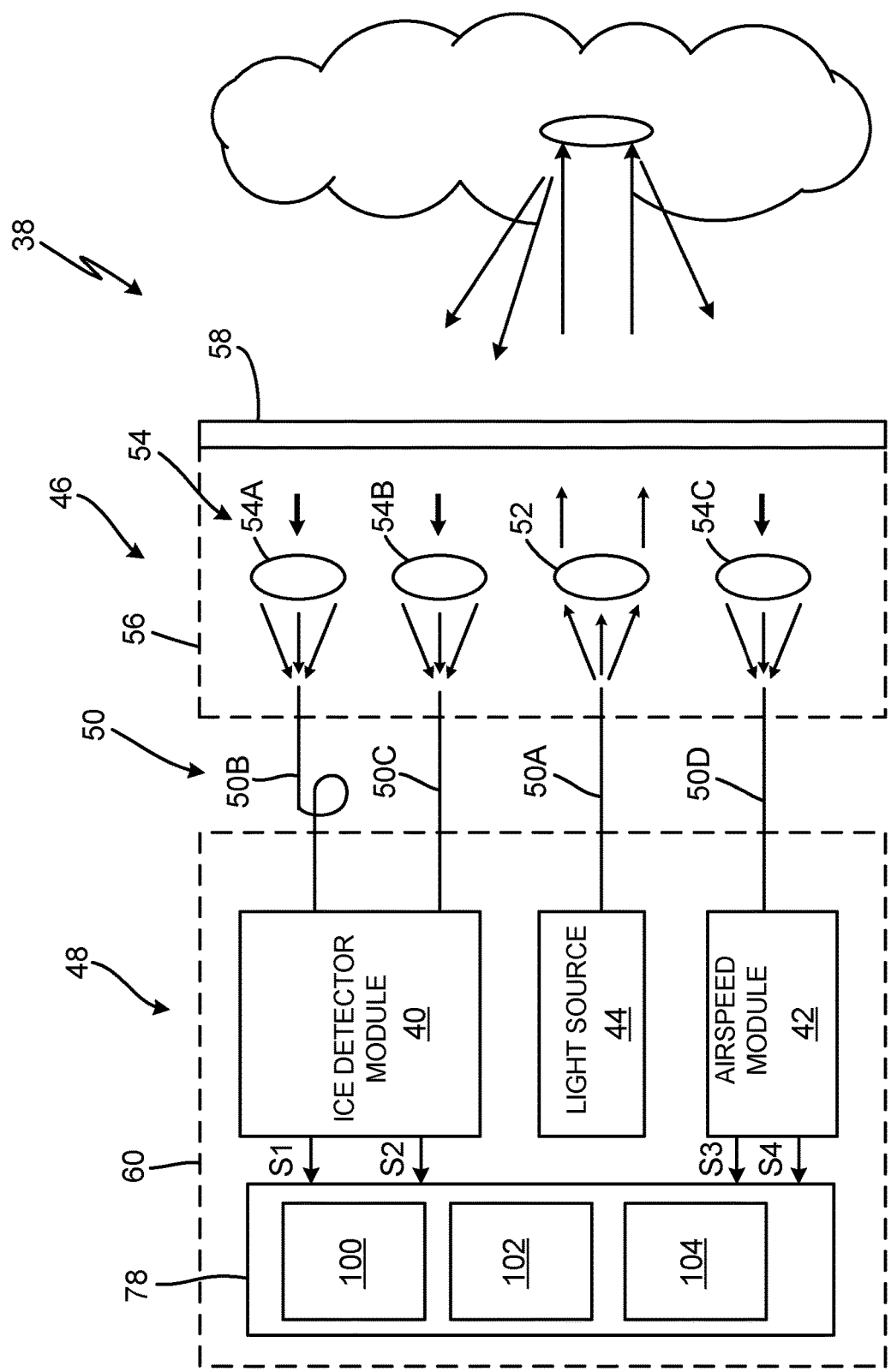
FIG. 3 is a schematic representation of the optical ice detection and airspeed probe.

FIG. 3 is a schematic representation of optical ice detection and airspeed probe 38 incorporating ice detection module 40 and airspeed module 42, each processing backscatter light returns reflected from particulate within an air space illuminated by collimated light source 44. Optical ice detection and airspeed probe 38 includes optical head 46 connected to electro-optical module 48 via fiber optic cables 50.

Optical head 46 includes at least one optical lens 52 for directing collimated light pulses into an airstream surrounding an exterior skin of aircraft 10 and two or more collecting lenses 54 for receiving backscatter light returns from the airstream. Optical lens 52 and collector lens 54 are enclosed within head housing 56, and each of optical lens 52 and collector lenses 54 can be collimating lenses. Window 58 closes an exterior end of head housing 56 to permit transmission of collimated light pulses and backscatter light returns to and from optical head 46. Window 58 can be aligned with and conform to a shape of the aircraft exterior skin to provide an uninterrupted and continuous exterior to aircraft 10. Alternatively, optical head 46 can protrude from the exterior skin of aircraft 10 into the oncoming airflow. In such embodiments, head housing 56 and window 58 can be aerodynamically shaped to minimize disruption to the airflow flowing along aircraft 10. In either case, optical lens 52 and/or collector lenses 54 can be oriented within optical head 46 to emit collimated light towards and receive backscatter light returns from an airspace surrounding the aircraft.

Electro-optical module 48 is mounted remotely from optical head 46 within an interior space of aircraft 10. Module housing 60 encloses light source 44, ice detector module 40, and airspeed module 42. Light source 44 emits light along fiber optic cable 50A to optical lens 52. Ice detector module 40 receives backscatter light returns through at least one collector lens 54A. In some embodiments, ice detector module 64 receives backscatter light returns through two or more collectors lens 54A and 54B. Embodiments of ice detector module 40 incorporating multiple collector lens 54A and 54B may receive light through fiber optic cables 50B and 50C, one of which may be configured as a fiber optic delay cable such that backscatter light returns received through collector lens 54A reaches a light detector within ice detection module 40 at a different time than backscatter light returns received through collector lens 54B. Airspeed module 42 receives backscatter light returns through collector lens 54C and fiber optic cable 50D. Optical lens 52 and collector lens 54A, 54B, and 54C are collimating lenses.

Figure 4:
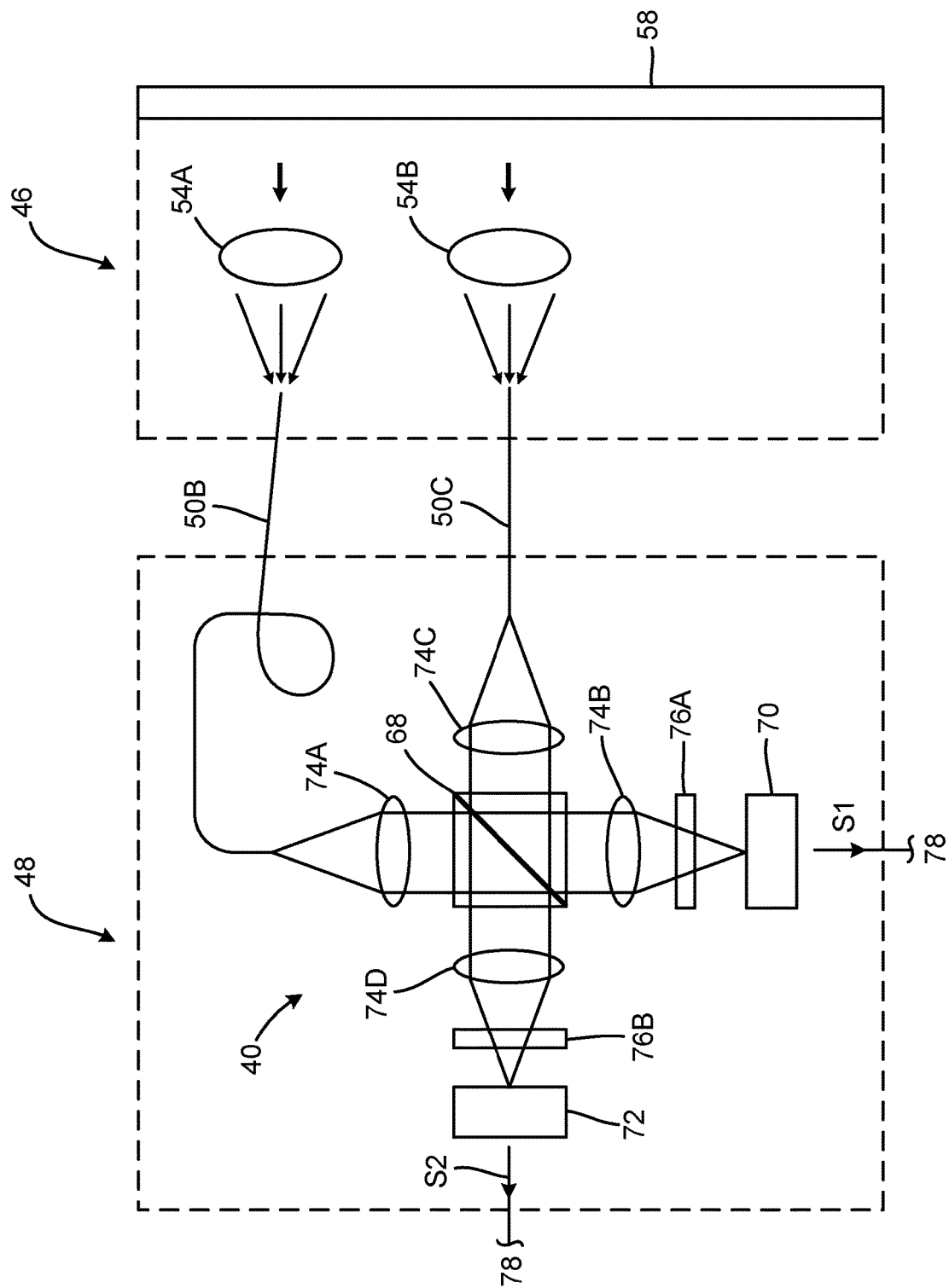
FIG. 4 is a schematic representation of an ice detection module of the optical ice detection and airspeed probe.

FIG. 4 is a schematic diagram of ice detection module 40 communicating with multiple collector lens 54A, 54B. Backscatter light returns received through collector lens 54B via fiber optic cable 50C passes through beam splitter 68 before reaching photodetectors 70 and 72, which can be configured as high-gain and low-gain photodetectors, respectively. Backscatter light returns received through collector lens 54A via fiber optic delay cable 50B reaches photodetectors 70 and 72 after backscatter light returns received through lens 54B, the time delay proportional to the length difference between fiber optic cables 50B and 50C.

Prior to and after passing through beam splitter 68, backscatter light returns pass through internal collimating lens 74A, 74B, 74C, and 74D as well as bandpass filters 76A and 76B which can be tailored to direct a desired wavelength to each of photodetectors 70 and 72. Photodetector 70 outputs signal S1 and photodetector 72 outputs signal S2 to electronics module 78, each indicative of the light intensity, frequency, and/or time delay of backscatter light received through collector lenses 54A and 54B.

Figure 5:
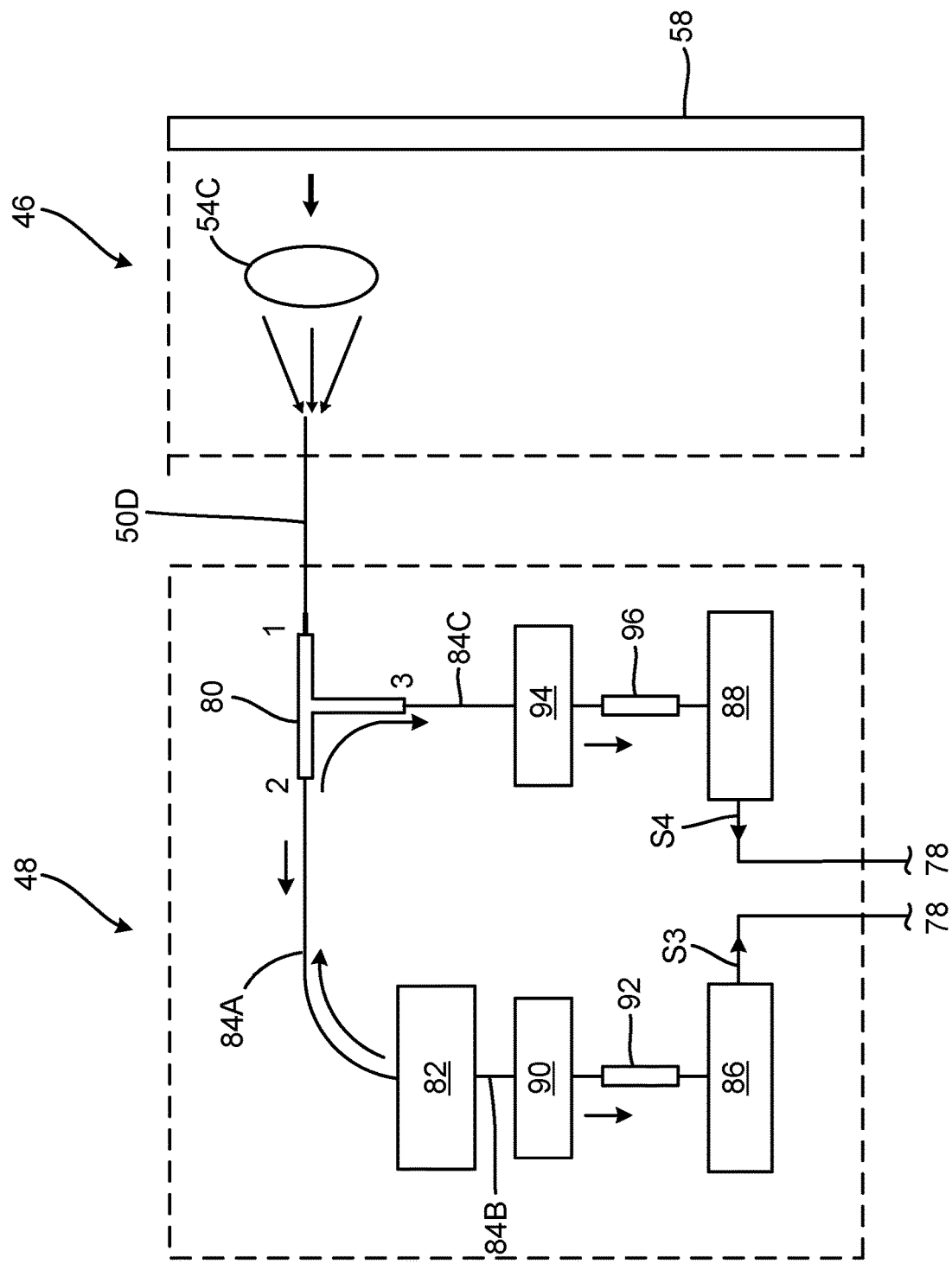
FIG. 5 is a schematic representation of an airspeed module of the optical ice detection and airspeed probe.

FIG. 5 is a schematic diagram of airspeed module 42 communicating with collector lens 54C in which airspeed module 42 utilizes an optical filter-edge technique for determining Doppler wavelength shift. However, airspeed module 42 may contain other components for utilizing a different Doppler shift detection technique. For instance, Doppler wavelength shift can be determined by optically mixing light emitted from light source 44 with Doppler-shifted backscatter returns received through collector lens 54C of airspeed module 42. A signal indicative of the mixed light is characterized by a beat frequency proportional to the wavelength difference between the emitted and received light. In other examples, airspeed module 42 passes backscatter light returns through a multimode fiber optic. The output of the multimode fiber optic produces a two-dimensional light pattern that changes as a function of the backscatter wavelength. Doppler wavelength shift is determined by comparing the backscatter wavelength to a known wavelength of emitted light.

Embodiments of airspeed module 42 implementing the optical filter-edge technique may include circulator 80 with three ports number 1, 2, and 3 as shown. Port 1 of circulator 80 connects to collector lens 54C via fiber optic cable 50D. Port 2 connects to optical filter 82 via fiber optic cable 84A, and optical filter 82 connects to photodetector 86 via fiber optic cable 84B. Port 3 of circulator 80 connects to photodetector 88 through fiber optic cable 84C. Optionally, fiber optic amplifier 90, narrow band filter 92, or both fiber optic amplifier 90 and narrow band filter 92 can be included between optical filter 82 and photodetector 86. Similarly, fiber optic amplifier 94 and narrow band filter 96, or both fiber optic amplifier 94 and narrow band filter 96 can be included between port 3 of circulator 80 and photodetector 88. In each case, fiber optic amplifiers 90, 94 and/or narrow band filters 92, 96 are used to condition backscatter light returns received through collection lens 54C before reaching photodetectors 86, 88 depending on the strength of the returns.

Figure 6:
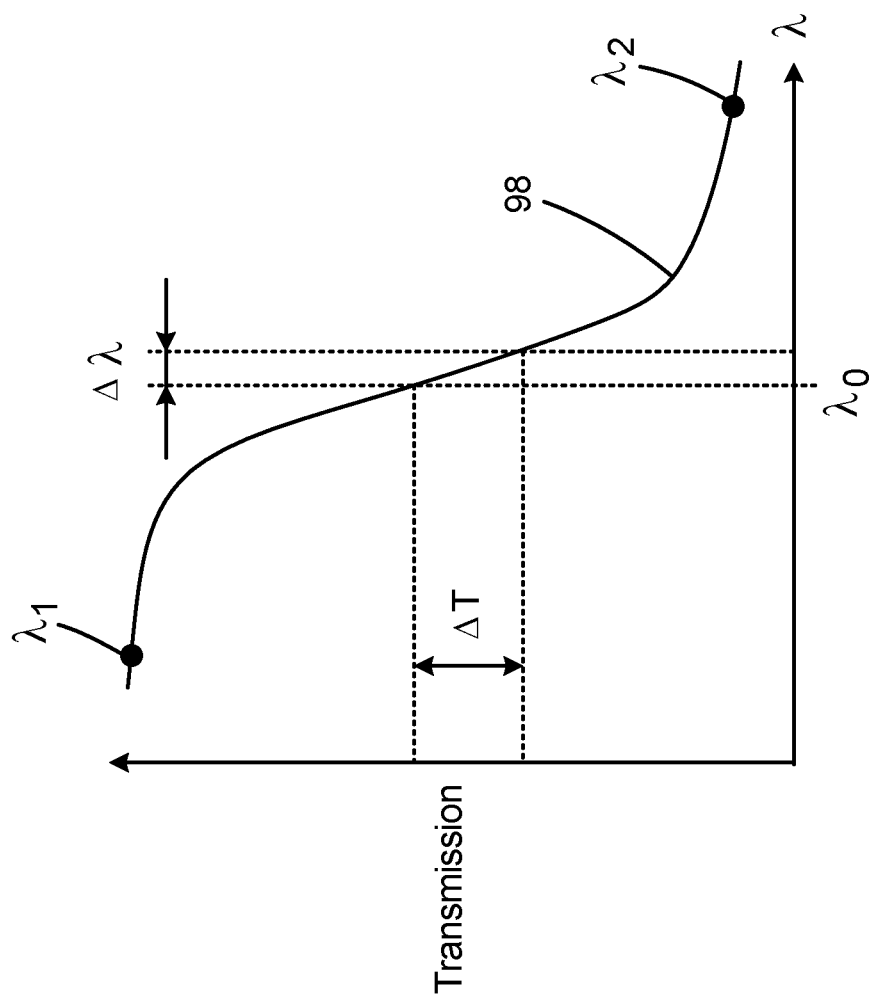
FIG. 6 is an exemplary response curve for an optical filter utilized in the airspeed module.

Optical filter 82 can be a beam splitter characterized by response curve 98 depicted by FIG. 6. As shown, the transmission response of curve 98 has a sharp cut off with respect to wavelength. For instance, optical filter 82 can be tuned such that the frequency of the emitted collimated light pulses is approximately half-way down the cut-off edge of response curve 98. Due to the Doppler effect, backscatter light returns will fall along the cut-off edge and differ from the emission frequency by $\Delta\lambda$ causing the transmission of backscatter light returns to differ from the emitted collimated light pulses by $\Delta T$. Accordingly, a first portion of the backscatter light return will be transmitted or passed through optical filter 82 and along fiber optic cable 84B to photodetector 86. A second or remaining portion of the backscatter light return will be reflected by optical filter 82 and pass from port 2 to port 3 of circulator 80 before reaching photodetector 88 via fiber optic cable 84C. Photodetector 86 converts the first portion of backscatter light returns into signal S3, and photodetector 88 converts the second portion of backscatter light returns into signal S4. Signals S3 and S4 are sent to electronics module 78 for determining a frequency shift between of the backscatter light returns and thereby a line-of-sight airspeed.

Electronics module 78 can be mounted within electro-optical module 48 as shown in FIG. 3. Alternatively, electronics module 78 can be operatively associated with another component of air data system 26, or aircraft consuming system, in which electronics module 78 may be mounted remotely from optical ice detector and airspeed probe 38. For instance, electronics module 78 can be mounted and incorporated into multi-function probe 32, an air data computer, or other component of air data system 26. Wherever located, electronics module 78 includes at least processor 100, computer-readable memory 102, and communication device 104, but may also include additional components necessary or desired for implementation into those components.

Examples of processor 100 can include any one or more of a microprocessor, a controller, a digital signal processor (DSP), an application specific integrated circuit (ASIC), a field-programmable gate array (FPGA), or other equivalent discrete or integrated logic circuitry.

Computer-readable memory 102 can be configured to store information within electronics module 78 during operation. Computer-readable memory 102, in some examples, is described as a computer-readable storage medium. In certain examples, a computer-readable storage medium can include a non-transitory medium. The term "non-transitory" can indicate that the storage medium is not embodied in a carrier wave or a propagated signal. In some examples, a non-transitory storage medium can store data that can, over time, change (e.g., in RAM or cache). Computer-readable memory 102 can include volatile memory, non-volatile memory, or both. Examples of volatile memories can include random access memories (RAM), dynamic random access memories (DRAM), static random access memories (SRAM), and other forms of volatile memories. Examples of non-volatile memories can include flash memories, forms of electrically programmable memories (EPROM) or electrically erasable and programmable (EEPROM) memories, magnetic hard discs, optical discs, floppy discs, or other forms of non-volatile memories.

Communication device 104 can be network interface cards (or other interface devices) configured to send and receive data over a communications network and/or data bus according to one or more communications protocols, such as the ARINC 429 communication protocol, CAN bus communication protocol, MIL-STD-1553 communication protocol, or other communication protocol.

Figure 7:
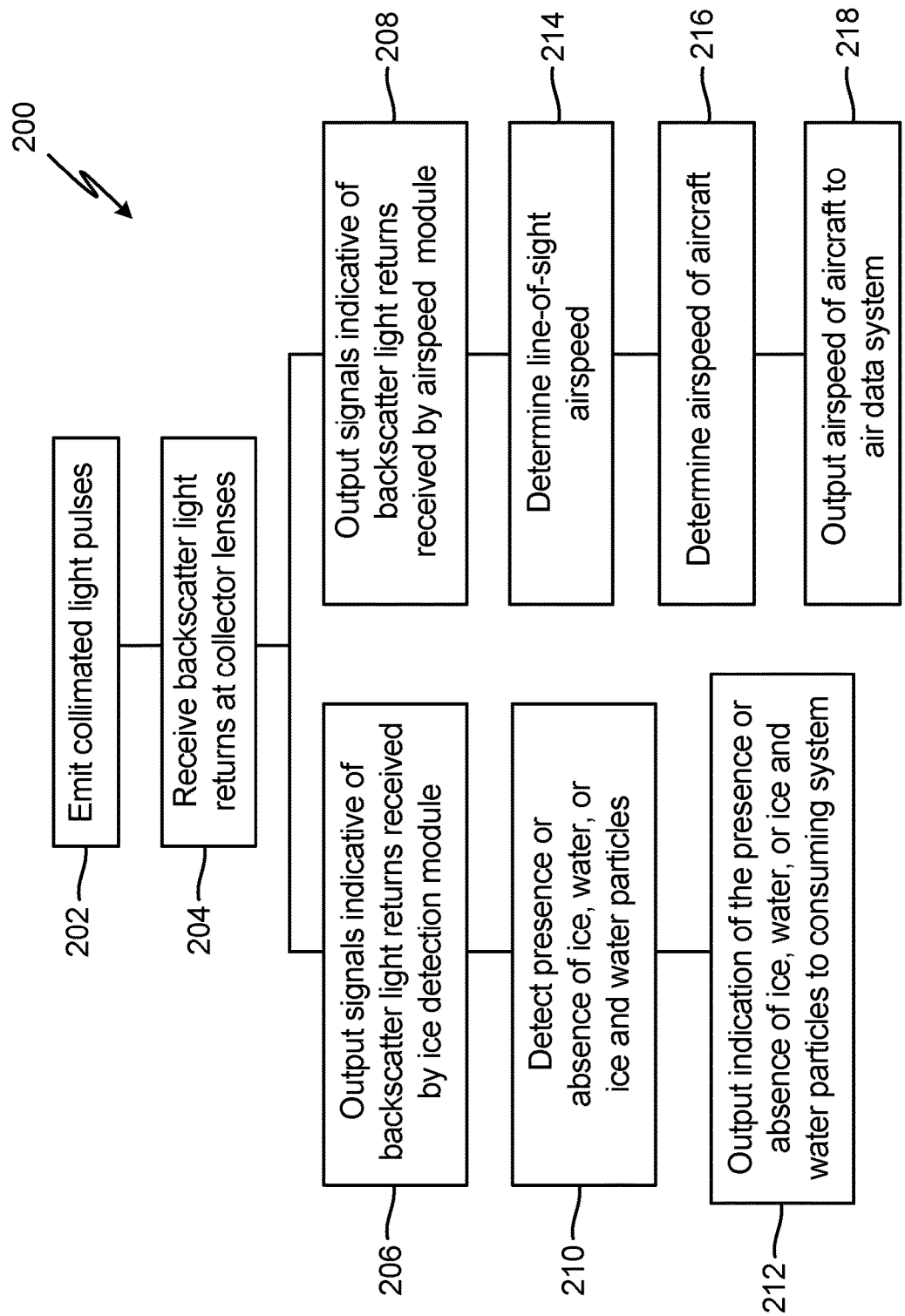
FIG. 7 is a flow chart describing the steps of a method of determining an airspeed from the optical ice detection and airspeed probe.

Computer-readable memory 102 is encoded with instructions, that when executed by processor 100, cause the electronics module 78 to perform steps of method 200 for determining the presence or absence of ice in a surrounding airspace and for determining an airspeed of aircraft 10. Method 200 includes steps 202, 204, 206, 208, 210, 212, 214, 216, 218, and 220. Electronics module 78 repeatedly performs steps of method 200 during flight of aircraft 10 at a desired update rate as shown in FIG. 7.

In step 202 of method 200, electronics module 78 causes light source 44 to emit light through optical lens 52 along directional vector L. In step 204, backscatter light returns are received at collector lens 54A and 54B of ice detection module 40 and at collector lens 54C of airspeed module 42. In step 206, ice detection module 40 outputs signals S1 and S2, and in step 208, airspeed module 42 outputs signals S3 and S4, each signal S1, S2, S3, and S4 indicative of the light intensity, frequency, and/or time delay of backscatter light received through one of collector lenses 54A, 54B and 54C. In step 210, electronics module 78 determines the presence or absence of icing-conditions in the surrounding airspace and outputs an indication thereof to a consuming system of the aircraft in step 212. Electronics module 78 also determines a line-of-sight airspeed based on a Doppler shift of the backscatter light returns as determined by signals S3 and S4 in step 214. Subsequently in step 216, electronics module 78 determines an airspeed of aircraft 10 based on line-of-sight airspeed and at least one other air data parameter to account for a difference between directional vector L and the forward movement of aircraft 10. For instance, line-of-sight airspeed can be correlated to airspeed of aircraft 10 based on angle of attack, angle of sideslip, altitude, inertial data, or a combination of the foregoing parameters. At step 218, electronics module 78 outputs airspeed of aircraft 10 to air data system 26, or other consuming system of aircraft 10.

Discussion of Possible Embodiments

The following are non-exclusive descriptions of possible embodiments of the present invention.

A system according to an exemplary embodiment of this disclosure, among other possible things includes an optical ice detector and airspeed probe and an electronics module. The optical ice detector and airspeed probe includes a light source, an ice detector module, and an airspeed module. The light source is mounted to an exterior of an aircraft and oriented to emit collimated light pulse into an airspace forward of the aircraft. The ice detector module is configured to output a detection signal to a consuming system of the aircraft, the detection signal indicative of the presence or absence of ice, water, or ice and water particles based on backscatter light returns received from the airspace. The airspeed module is configured to output a line-of-sight signal indicative of a line-of-sight airspeed based on backscatter light returns received from the airspace. The electronics module communicates with the optical ice detector and transmits air data outputs to an air data system of the aircraft. The air data outputs include an airspeed of the aircraft determined based on the line-of-sight signal to the air data system of the aircraft.

The system of the preceding paragraph can optionally include, additionally and/or alternatively, any one or more of the following features, configurations and/or additional components.

A further embodiment of the foregoing system can further include a multi-function probe (MFP) comprising a plurality of pressure sensing ports for sensing pressure of an oncoming airflow about the exterior of the aircraft.

A further embodiment of any of the foregoing systems, wherein the electronics module can determine the airspeed of the aircraft based on the line-of-sight signal and a pressure difference of the oncoming airflow sensed by the MFP.

A further embodiment of any of the foregoing systems, wherein the pressure difference sensed by the MFP is indicative of an angle of attack of the aircraft.

A further embodiment of any of the foregoing systems, wherein the pressure difference sensed by the MFP is indicative of an angle of sideslip of the aircraft.

A further embodiment of any of the foregoing systems can further include a static pressure probe mounted to the exterior of the aircraft opposite the MFP and comprising a static pressure port communicating with the oncoming airflow about the exterior of the aircraft.

A further embodiment of any of the foregoing systems, wherein the electronics module can determine the airspeed of the aircraft based on the line-of-sight signal and a pressure difference between a first static pressure sensed by the MFP and a second static pressure sensed by the static pressure probe.

A further embodiment of any of the foregoing systems can further include an angle of attack sensor comprising a rotatable vane extending into and aligning with an oncoming airflow about the exterior of the aircraft.

A further embodiment of any of the foregoing systems, wherein the electronics module determines the airspeed of the aircraft based on the line-of-sight signal and angle of attack data sensed by the angle of attack sensor.

A further embodiment of any of the foregoing systems can further include an angle of sideslip sensor comprising a rotatable vane extending into and aligning with an oncoming airflow about the exterior of the aircraft.

A further embodiment of any of the foregoing systems, wherein the electronics module can determine the airspeed of the aircraft based on the line-of-sight signal and angle of sideslip data sensed by the angle of sideslip sensor.

A further embodiment of any of the foregoing systems can further include a first static pressure probe and a second static pressure probe mounted on an opposite side of the aircraft relative to the first static pressure probe, the second static pressure probe comprising a second static pressure port communicating with the oncoming airflow about the exterior of the aircraft.

A further embodiment of any of the foregoing systems, wherein the electronics module can determine the airspeed of the aircraft based on the line-of-sight signal and a pressure difference between a first static pressure sensed by the first static pressure probe and a second static pressure sensed by the second static pressure probe.

A further embodiment of any of the foregoing systems can further include an inertial reference unit (IRU) comprising one or more accelerometers and one or more gyroscopic sensors for sensing linear and rotational acceleration, respectively, of the aircraft.

A further embodiment of any of the foregoing systems, wherein the electronics module can determine the airspeed of the aircraft based on the line-of-sight signal and inertial data sensed by the IRU.

A further embodiment of any of the foregoing systems can further include an avionics module of the aircraft.

A further embodiment of any of the foregoing systems, wherein the electronics module can determine the airspeed of the aircraft based on the line-of-sight signal and position data of one or more control surfaces of the aircraft received from the avionics module.

An optical ice detector and airspeed probe according to an exemplary embodiment of this disclosure, among other possible things includes an optical head and an electro-optical module. The optical head includes first, second, third, and fourth collimating lenses. The electro-optical module includes a light source, an ice detection module and an airspeed module. The light source is connected to the first collimating lens via a first fiber optic cable. The ice detection module is connected to the second and third collimating lenses via second and third fiber optic cables respectively. The airspeed module connects to the fourth collimating lens via a fourth fiber optic cable. The ice detection module outputs signals indicative of the presence or absence of ice, water, or ice and water based on backscatter light returns received through the second and third collimating lenses, and the airspeed module outputs a line-of-sight airspeed along a directional vector based on a Doppler shift of backscatter light returns received through the fourth collimating lens.

The optical ice detector and airspeed probe of the preceding paragraph can optionally include, additionally and/or alternatively, any one or more of the following features, configurations and/or additional components.

A further embodiment of the foregoing optical ice detector and airspeed probe, wherein the airspeed module can include an optical filter characterized by a drop-off response between a first frequency and a second frequency.

A further embodiment of any of the foregoing optical ice detector and airspeed probes, wherein a frequency of light emitted from the light source can be between the first frequency and the second frequency of the optical filter response curve.

A further embodiment of the foregoing optical ice detector and airspeed probes, wherein the optical filter of the airspeed module can transmit a first portion of backscatter light returns to a first photodetector and reflects a second portion of backscatter light returns to a second photodetector.

A further embodiment of any of the foregoing optical ice detector and airspeed probes, wherein the line-of-sight airspeed can be based on a first signal received from the first photodetector indicative of a first portion of backscatter light returns and a second signal received from the second photodetector indicative of the second portion of backscatter light returns.

A system according to an exemplary embodiment of this disclosure, among other possible things includes an optical ice detector and airspeed probe that includes an airspeed module and an ice detection module. The air speed module is coupled to a first air data system of an aircraft, and the ice detection module is coupled to a consuming system of the aircraft that is different from the first air data system.

The system of the preceding paragraph can optionally include, additionally and/or alternatively, any one or more of the following features, configurations and/or additional components.

A further embodiment of the foregoing system, wherein the optical ice detector and airspeed probe includes an optical head.

A further embodiment of any of the foregoing systems, wherein the optical head can include first, second, third, and fourth collimating lenses.

A further embodiment of any of the foregoing systems, wherein the optical ice detector and airspeed probe can include an electro-optical module.

A further embodiment of any of the foregoing systems, wherein the electro-optical module can include a light source connected to the first collimating lens of the optical head via a first fiber optic cable.

A further embodiment of any of the foregoing systems, wherein the electro-optical module can include the airspeed module and the ice detection module.

A further embodiment of any of the foregoing systems, wherein the ice detection module can be connected to the second and third collimating lenses via second and third fiber optic cables, respectively.

A further embodiment of any of the foregoing systems, wherein the ice detection module can output signals indicative of the presence or absence of ice, water, or ice and water based on backscatter light returns received through the second and third collimating lenses.

A further embodiment of any of the foregoing systems, wherein the airspeed module can be connected to the fourth collimating lens via a fourth fiber optic cable.

A further embodiment of any of the foregoing systems, wherein the airspeed module can output a line-of-sight airspeed along a directional vector based on a Doppler shift of backscatter light returns received through the fourth collimating lens.

A further embodiment of any of the foregoing systems, wherein the airspeed module can include an optical filter characterized by a drop-off response between a first frequency and a second frequency.

A further embodiment of any of the foregoing systems, wherein a frequency of light emitted from the light source can be between the first frequency and the second frequency of the optical filter response curve.

A further embodiment of the foregoing systems, wherein the optical filter of the airspeed module can transmit a first portion of backscatter light returns to a first photodetector and reflects a second portion of backscatter light returns to a second photodetector.

A further embodiment of any of the foregoing systems, wherein the line-of-sight airspeed can be based on a first signal received from the first photodetector indicative of a first portion of backscatter light returns and a second signal received from the second photodetector indicative of the second portion of backscatter light returns.

A further embodiment of any of the foregoing systems can further comprise an angle of attack sensor.

A further embodiment of any of the foregoing systems, wherein the angle of attack sensor and the airspeed module are coupled to the first air data system.

A further embodiment of any of the foregoing systems can further comprise a first multi-function probe (MFP) comprising a first plurality of pressure sensing ports for sensing pressure of an oncoming airflow about an exterior of the aircraft.

A further embodiment of any of the foregoing systems, wherein the first MFP can include a first electronics channel.

A further embodiment of any of the foregoing systems, wherein the first electronics channel of the first MFP, the angle of attack sensor, and the airspeed module are coupled to the first air data system.

A further embodiment of any of the foregoing systems can further comprise a first static pressure probe comprising a static pressure port for sensing a static pressure of the oncoming airflow.

A further embodiment of any of the foregoing systems, wherein the first electronics channel of the first MFP, the angle of attack sensor, the airspeed module, and the static pressure probe are coupled to the first air data system.

An air data system probe according to an exemplary embodiment of this disclosure, among other possible things includes an optical ice detector and airspeed probe and an electronics module. The electronics module includes a processor and computer-readable memory encoded with instructions that, when executed by the processor cause the electronics module to emit, using the optical ice detector and airspeed probe, a collimated light pulse into oncoming air about the aircraft and receive, at the optical ice detector and airspeed probe, backscatter light returns produced by the collimated light pulse interacting with the oncoming air. The instructions further cause the electronics module to 1) determine a line-of-sight airspeed of the aircraft based on the backscatter light returns, 2) determine an airspeed of the aircraft based on the line-of-sight airspeed and at least one aircraft parameter, 3) detect the presence or absence of ice, water, or ice and water particles within the oncoming air about the aircraft based on the backscatter light return, and 4) output the airspeed to a first consuming system of the aircraft.

The air data system of the preceding paragraph can optionally include, additionally and/or alternatively, any one or more of the following features, configurations and/or additional components.

The air data system of the foregoing paragraph, wherein the computer-readable memory is encoded with instructions that, when executed by the processor, cause the electronics module to output an indication of the presence or absence of ice, water, or ice and water particles within the oncoming air to a second consuming system of the aircraft that is different from the first consuming system.

The air data system of any of the foregoing paragraphs, wherein the line-of-sight airspeed is determined based on a frequency difference between the collimated light pulse and the backscatter light return.

The air data system of any of the foregoing paragraphs, wherein the collimated light pulse is emitted by the optical ice detector and airspeed probe at an angle with respect to a longitudinal centerline of the aircraft towards an airspace forward of the aircraft wing.

The air data system of any of the foregoing paragraphs, wherein the collimated light pulse is emitted by the optical ice detector and airspeed probe at an angle between 0 degrees and 45 degrees with respect to a longitudinal centerline of the aircraft towards an airspace forward of the aircraft.

The air data system of any of the foregoing paragraphs, wherein the collimated light pulse is emitted by the optical ice detector and airspeed probe at an angle between 0 degrees and 15 degrees with respect to a longitudinal centerline of the aircraft towards an airspace forward of the aircraft.

The air data system of any of the foregoing paragraphs can further include an angle of attack sensor.

The air data system of any of the foregoing paragraphs, wherein the airspeed is determined based on the line-of-sight airspeed and angle of attack data output by the angle of attack sensor.

The air data system of any of the foregoing paragraphs, wherein the electronics module is enclosed within the optical ice detector and airspeed probe.

A method of determining an airspeed of an aircraft according to an exemplary embodiment of this disclosure, among other things, includes 1) emitting, using an optical ice detector and airspeed probe, a collimated light pulse into oncoming air about the aircraft, 2) receiving, at the optical ice detector and airspeed probe, backscatter light returns produced by the collimated light pulse interacting with the oncoming air, 3) determining a line-of-sight airspeed of the aircraft based on the backscatter return, 4) determining an airspeed of the aircraft based on the line-of-sight airspeed and at least one aircraft parameter, 5) detecting the presence or absence of ice, water, or ice and water particles within the air about the aircraft based on the backscatter return, and 6) outputting the airspeed to a first consuming system of the aircraft.

The method of the preceding paragraph can optionally include, additionally and/or alternatively, any one or more of the following features, configurations, additional components, and/or steps.

A further embodiment of the foregoing method, wherein the line-of-sight airspeed can be determined based on a frequency difference between the collimated light pulse and the backscatter light returns.

A further embodiment of any of the foregoing methods, wherein the collimated light pulse can be emitted by the optical ice detector and airspeed probe at an angle between 0 degrees and 15 degrees with respect to a longitudinal centerline of the aircraft towards an airspace forward of the aircraft wing.

A further embodiment of any of the foregoing methods can further include receiving angle of attack data from one of an angle of attack sensor or a multi-function probe (MFP).

A further embodiment of any of the foregoing methods, wherein determining the airspeed of the aircraft can be based on the line-of-sight airspeed and the angle of attack data.

A further embodiment of any of the foregoing methods can further include receiving inertial data from an inertial reference unit of the aircraft.

A further embodiment of any of the foregoing methods, wherein determining the airspeed of the aircraft can be based on the line-of-sight airspeed and the inertial data.

A further embodiment of any of the foregoing methods can further include outputting an indication of the presence or absence of ice, water, or ice and water within the oncoming air to a second consuming system of the aircraft that is different from the first consuming system.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the particular embodiment(s) disclosed, but that the invention will include all embodiments falling within the scope of the appended claims.

The invention claimed is:

1. A system comprising:
an optical ice detector and airspeed probe comprising:
a light source mounted to an exterior of an aircraft and orientated to emit a collimated light pulse into an airspace forward of the aircraft;
an ice detector module configured to output a detection signal to a consuming system of the aircraft, the detection signal indicative of the presence or absence of ice, water, or ice and water particles based on a backscatter light return received from the airspace wherein the ice detector module comprises:
a beam splitter;
a first lens connected to the beam splitter via a first fiber optic cable;
a second lens connected to the beam splitter via a second fiber optic cable configured a time-delay cable relative to the first fibric optic cable;
a first photodetector connected to the beam splitter and configured to output a first signal based on the backscatter light return received through the first lens and the backscatter light return received through the second lens; and
a second photodetector connected to the beam splitter and configured to output a second signal based on the backscatter light return received through the first lens and the backscatter light return received through the second lens, wherein the detection signal is based on the first signal and the second signal;
an airspeed module configured to output a line-of-sight signal indicative of a line-of-sight airspeed based on the backscatter light return received from the airspace, wherein the airspeed module comprises:
a third lens;
a third photodetector configured to output a third signal based on the backscatter light return;
a fourth photodetector configured to output a fourth signal based on the backscatter light return;
an optical filter characterized by a drop-off response between a first frequency and a second frequency, wherein an emission frequency of the collimated light pulse is between the first frequency and the second frequency; and
a circulator comprising a first port, a second port, and a third port, wherein the first port is connected to the third lens, and wherein the second port is connected to the optical filter and the third photodetector, and wherein the third port is connected to the fourth photodetector, and wherein the line-of sight signal is determined based on a frequency difference between the third signal and the fourth signal; and
an electronics module communicating with the optical ice detector, wherein the electronics module transmits air data outputs to an air data system of the aircraft, wherein the air data outputs include an airspeed of the aircraft determined based on the line-of-sight signal to the air data system of the aircraft.

2. The system of claim 1, further comprising:
a multi-function probe (MFP) comprising a plurality of pressure sensing ports for sensing pressure of an oncoming airflow about the exterior of the aircraft, wherein the electronics module determines the airspeed of the aircraft based on the line-of-sight signal and a pressure difference of the oncoming airflow sensed by the MFP.

3. The system of claim 2, wherein the pressure difference is indicative of an angle of attack of the aircraft.

4. The system of claim 2, wherein the pressure difference is indicative of an angle of sideslip.

5. The system of claim 1, further comprising:
a multi-function probe (MFP) comprising a plurality of pressure sensing ports for sensing pressure of an oncoming airflow about the exterior of the aircraft, and
a static pressure probe mounted to the exterior of the aircraft opposite the MFP, wherein the static pressure probe comprises a static pressure port communicating with the oncoming airflow about the exterior of the aircraft, and wherein the electronics module determines the airspeed of the aircraft based on the line-of-sight signal and a pressure difference between a first static pressure sensed by the MFP and a second static pressure sensed by the static pressure probe.

6. The system of claim 1, further comprising:
an angle of attack sensor comprising a rotatable vane extending into and aligning with an oncoming airflow about an exterior of the aircraft, wherein the electronics module determines the airspeed of the aircraft based on the line-of-sight signal and angle of attack data sensed by the angle of attack sensor.

7. The system of claim 1, further comprising:
an angle of sideslip sensor comprising a rotatable vane extending into and aligning with an oncoming airflow about an exterior of the aircraft, wherein the electronics module determines the airspeed of the aircraft based on the line-of-sight signal and angle of sideslip data sensed by the angle of sideslip sensor.

8. The system of claim 1, further comprising:
a first static pressure probe comprising a first static pressure port communicating with an oncoming airflow about the exterior of the aircraft; and
a second static pressure probe mounted on an opposite side of the aircraft relative to the first static pressure probe, the second static pressure probe comprising a second static pressure port communicating with the oncoming airflow about the exterior of the aircraft, wherein the electronics module determines the airspeed of the aircraft based on the line-of-sight signal and a pressure difference between a first static pressure sensed by the first static pressure probe and a second static pressure sensed by the second static pressure probe.

9. The system of claim 1, further comprising:
an inertial reference unit (IRU) comprising one or more accelerometers and one or more gyroscope sensors for sensing linear and rotational acceleration, respectively, of the aircraft, wherein the electronics module determines the airspeed of the aircraft based on the line-of-sight signal and inertial data sensed by the IRU.

10. The system of claim 1, further comprising:
an avionics module of the aircraft, wherein the electronics module determines the airspeed of the aircraft based on the line-of-sight signal and position data of one or more control surfaces of the aircraft received from the avionics module.

11. An optical ice detector and airspeed probe comprising:
an optical head comprising first, second, third, and fourth collimating lenses;
an electro-optical module comprising:
a light source connected to the first collimating lens via a first fiber optic cable and configured to admit a light pulse at an emission frequency;
an ice detection module connected to the second and third collimating lenses via second and third fiber optic cables, respectively, wherein the ice detection module outputs signals indicative of the presence or absence of ice based on backscatter light returns received through the second collimating lens and a beam splitter at a first photodetector and a second photodetector and backscatter light returns received through a third collimating lens and the beam splitter at the first photodetector and the second photodetector, and wherein a second fiber optic cable connects the second collimating lens to the beam splitter and a third fiber optic cable connects the third collimating lens to the beam splitter, and wherein the third fiber optic cable is configured as a time-delay cable relative to the second fiber optic cable; and
an airspeed module connected to the fourth collimating lens via a fourth fiber optic cable, wherein the airspeed module outputs a line-of-sight airspeed along a directional vector based on a Doppler shift of backscatter light returns received through the fourth collimating lens, wherein the Doppler shift is determined based on backscatter light returns received through an optical filter characterized by a drop-off response between a first frequency and a second frequency, and wherein the emission frequency of the light pulse is between the first frequency and the second frequency.

12. The optical ice detector and airspeed probe of claim 11, wherein the optical filter of the airspeed module transmits a first portion of backscatter light returns to a first photodetector and reflects a second portion of backscatter light returns to a second photodetector.

13. The optical ice detector and airspeed probe of claim 12, wherein the line-of-sight airspeed is based on a first signal received from the first photodetector indicative of the first portion of backscatter light returns and a second signal received from the second photodetector indicative of the second portion of backscatter light returns.

14. An air data system for an aircraft comprising:
an optical ice detector and airspeed probe; and
an electronics module comprising;
  a processor; and
  computer-readable memory encoded with instructions that, when executed by the processor, cause the electronic module to:
    emit, through a first lens of the optical ice detector and airspeed probe, a collimated light pulse into oncoming air about the aircraft;
    receive, at a second lens, a third lens, and a fourth lens of the optical ice detector and airspeed probe, backscatter light returns produced by the collimated light pulse interacting with the oncoming air;
    determine a line-of-sight airspeed of the aircraft based on the backscatter light returns received through the fourth lens, wherein the line-of-sight airspeed is determined based on a frequency difference between backscatter light returns received at a third photodetector and a fourth photodetector, and wherein an optical filter between the third lens and the third photodetector has a drop-off response between a first frequency and a second frequency, and wherein an emission frequency of the collimated light pulse is between the first frequency and the second frequency;
    determine an airspeed of the aircraft based on the line-of-sight airspeed and at least one aircraft parameter;
    detect the presence or absence of ice, water, or ice and water particles within the oncoming air about the aircraft based on the backscatter light returns, wherein the presence or absence of ice, water, or ice and water particles is determined based on backscatter light returns received through a beam splitter by a first photodetector and a second photodetector, and wherein a first fiber optic cable connects the second lens to the beam splitter and a second fiber optic cable connects the third lens to the beam splitter, and wherein the second fiber optic cable is configured as a time-delay cable relative to the first fiber optic cable;
    output the airspeed to a first consuming system of the aircraft; and
    output an indication of the presence or absence of ice, water, or ice and water particles within the oncoming air to a second consuming system of the aircraft that is different from the first consuming system.

15. The air data system of claim 14, wherein the line-of-sight airspeed is determined based on a frequency difference between the collimated light pulse and the backscatter light returns.

16. The air data system of claim 14, wherein the collimated light pulse is emitted by the optical ice detector and airspeed probe at an angle with respect to a longitudinal centerline of the aircraft towards an airspace forward of a wing or a nose of the aircraft.

17. The air data system of claim 14, further comprising an angle of attack sensor communicating with the electronics module;
wherein the airspeed is determined based on the line-of-sight airspeed and angle of attack data output by the angle of attack sensor.

18. The air data system of claim 14, wherein the electronics module is enclosed within the optical ice detector and airspeed probe.

* * * * *